Sept. 1, 1964  J. M. SHEESLEY  3,146,681
PLUG VALVE OPERATOR

Filed Jan. 9, 1962  2 Sheets-Sheet 1

John M. Sheesley
INVENTOR.

BY

ATTORNEY

Sept. 1, 1964  J. M. SHEESLEY  3,146,681
PLUG VALVE OPERATOR

Filed Jan. 9, 1962  2 Sheets-Sheet 2

John M. Sheesley
INVENTOR.

BY
ATTORNEY

United States Patent Office 3,146,681
Patented Sept. 1, 1964

3,146,681
PLUG VALVE OPERATOR
John M. Sheesley, P.O. Box 9365, Houston, Tex.
Filed Jan. 9, 1962, Ser. No. 165,098
2 Claims. (Cl. 92—13)

This invention relates to apparatus for hydraulic or pneumatic operation of valves, particularly plug valves, or other valves which require only a relatively small movement to be operated from full open to fully closed.

As automation of chemical and refinery plant processes has increased it has become increasingly necessary to have dependable apparatus for operating the valves in the plant processes. It has been apparent that pneumatic or hydraulic means offer a ready solution to the automatic operation of valves. Thus it is known to use hydraulic or pneumatic means to operate plug valves or other valves which require only a limited movement to be operated from full open to fully closed. It will be apparent that it is highly desirable for any such valve operators to be extremely dependable so that a minimum of maintenance is required and that the cost of such operators should be as low as possible. Thus it is extremely important for any such devices to be made as simply as is possible.

Accordingly to the present invention a remarkably simple device is provided for operating plug valves through their full 90° rotation. This device consists of only four machined parts and is substantially maintenance free. Thus assembly and reassembly are made extremely easy by the novel construction of the valve operator of this invention.

For better understanding of this invention reference is now made to the accompanying drawing, wherein FIGURE 1 is an elevational view of an embodiment of the operator of this invention shown in position on a plug valve;

Figure 1:
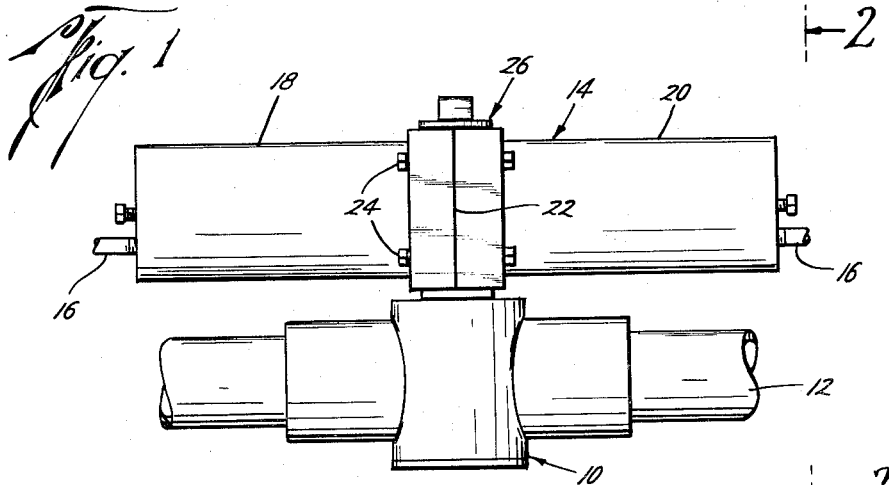
Figure 3:
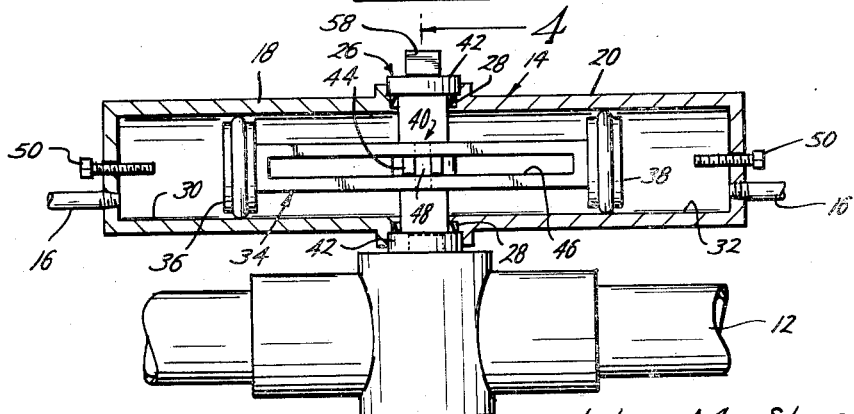
FIGURE 3 is a view similar to FIGURE 1 except that the operator is shown in vertical section.

FIGURE 1 shows a plug valve 10 connected in a flow line 12 and having one embodiment of the valve operator of this invention mounted thereon, as shown at 14. Fluid lines 16 are provided for furnishing fluid to the valve operator for operation thereof. Two housing halves 18 and 20 form the body of the operator and are joined at 22 to form a unitary housing member. The two halves are held together by cap screws 24. As better seen in FIGURE 3, a vertical shaft 26 is rotatably disposed and mounted for rotation between the two housing halves. Sleeve bearings 28 are mounted between the vertical shaft and the two housing halves. The sleeve bearings may be made of bronze or nylon or other suitable bearing material and are preferably split for installation around the one-piece shaft, which is provided with a collar 42 at each end for axial positioning of the shaft and retention of the bearings.

Figure 5:
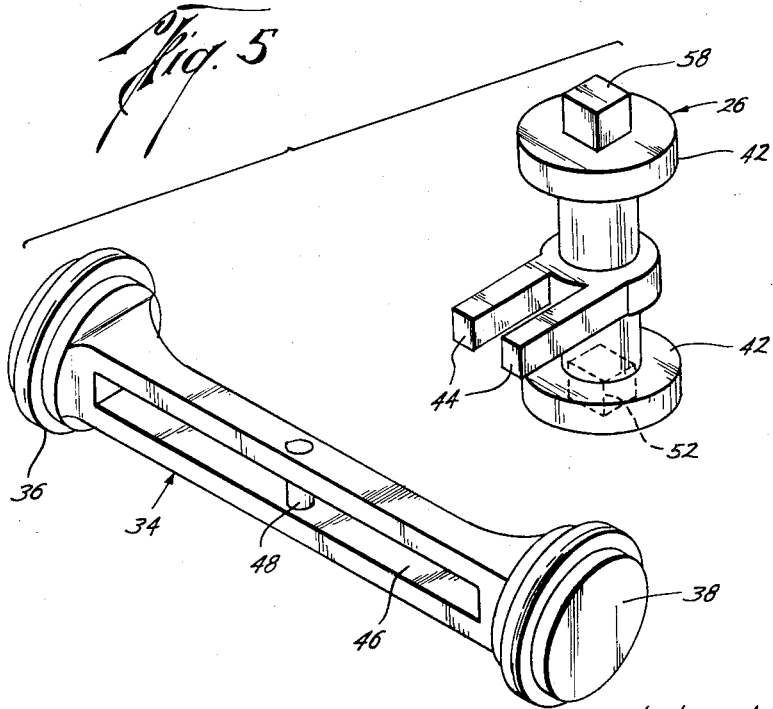
FIGURE 5 is an isometric exploded view of the novel means utilized for converting linear to rotary motion in one embodiment of this invention.

Housing halves 18 and 20 are bored to provide opposing cylinders 30–32 which are in axial alignment with each other. A connecting rod 34 extends axially of said cylinders and is provided at each end with a piston 36–38, one of which operates in each cylinder 30–32. A scotch yoke mechanism 40 provides engagement between the connecting rod 34 and vertical shaft 26. For a better understanding of this scotch yoke connection reference is now made to FIGURE 5. Here it will be seen that the vertical shaft 26 comprises a cylindrical member having a flange 42 on each end thereof. Intermediate the flanges of the shaft a pair of fingers 44 extend perpendicularly of the shaft and parallel to each other and in the same horizontal plane. When assembled these fingers fit within a slot 46 which extends longitudinally of the connecting rod 34. A pin 48 traverses the slot 46 substantially at the mid-point thereof for engagement by the fingers 44. It will be apparent that when the fingers 44 are engaging the pin 48 and the connecting rod 34 is moved longitudinally, the shaft 26 will be rotated. The proportioning of the elements of the scotch yoke thus provided are such that upon full movement of the connecting rod from one end to the other the shaft will be rotated approximately 90° in the preferred embodiment. Adjustment of the amount of this rotation can be made by means of the adjusting screws 50 shown in FIGURE 3 of the drawing at each end of the cylinders 30 and 32. It will be seen that the adjusting screws limit the travel of the pistons and therefore limit the rotation of the shaft.

Figure 4:
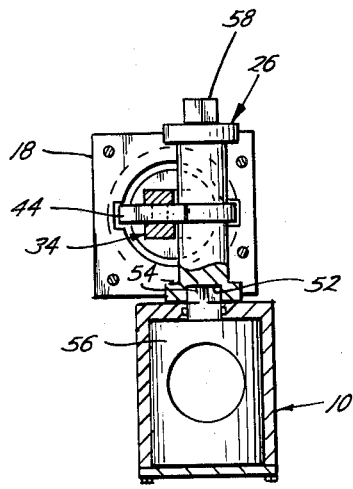
FIGURE 4 is a vertical sectional view of the embodiment of the operator shown in FIGURES 1 to 3 taken at line 4—4 of FIGURE 3.

As is more clearly shown in FIGURE 4 the bottom end of the shaft 26 is provided with a socket 52 for engagement with the stem 54 of the valve core 56. The socket 52 and the stem 54 are shown as being square in the drawing, however it is well known that other shapes such as hexagon shapes are used for this purpose. Similarly at the other end of the vertical shaft a square or other shaped head 58 is provided for engagement by a wrench for manual operation of the valve if such operation is desired.

Figure 2:
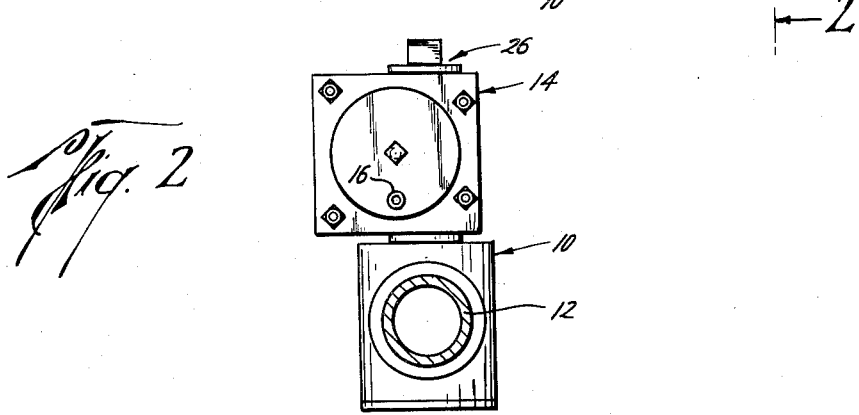
FIGURE 2 is a right end view of the embodiment shown in FIGURE 1 taken at line 2—2 of FIGURE 1.

It will be apparent that operation of the valve by means of the valve operator of this invention is attained merely by providing fluid pressure to one side of the valve operator so as to move one of the pistons 36 or 38. Such pressurizing of one of the cylinders results in longitudinal movement of the connecting rod 34 which, through the scotch yoke connection, causes rotary operation of the shaft which is engaged with the stem of the valve core and therefore causes the core to rotate. It will be noted from FIGURES 2 and 4 that the valve operato ris not centrally disposed with respect to the valve body because of the necessity for the shaft 26 to be directly over the stem of the valve core.

The advantages of the construction of this valve operator as compared to those of the prior art will be apparent. The structure is such that the device can be completely disassembled and reassembled in a matter of minutes. The use of a split housing allows unitizing of what was previously several elements into a single element. The original cost of the operator and the cost of maintenance of the operator is greatly reduced by such simplification of the elements of the device.

Although a specific embodiment of the invention has been shown and described, the invention is not limited thereto, but only to the structure defined by the following claims.

I claim:

1. A valve operator comprising a unitary housing member composed of a pair of housing halves joined together, a cylinder in each housing half, said cylinders being in axial alignment with each other, a closed end and an open end on each cylinder, said open ends being faced toward each other, means for introducing fluid under pressure into the closed end of each cylinder, a piston in each cylinder, a connecting rod connecting said pistons, a longitudinally extending slot in said connecting rod, a pin extending transversely of said slot substantially midway between said pistons, a shaft positioned between said housing halves, extending out of said housing on either end, split bearing means between housing halves mounting said shaft for rotation about its axis perpendicular to and displaced laterally away from the axis of said cylinders, a pair of fingers extending perpendicularly from said shaft into engagement with said pin, whereby longitudinal movement of said connecting rod causes rotation of said shaft about its axis, a flange on each end of said shaft outside said housing adapted to enclose said bearing means and position said shaft with respect to said housing, and means on one end of said shaft adapted to engage a valve stem, whereby application of fluid under pressure to said cylinders causes rotation of said valve.

2. A valve operator as defined by claim 1, including means in the closed end of each of said cylinders adapted to adjustably limit the longitudinal movement of said pistons.

References Cited in the file of this patent

UNITED STATES PATENTS

| | | |
|---|---|---|
| 1,119,758 | Kings | Dec. 1, 1914 |
| 1,395,604 | Skinner | Nov. 1, 1921 |
| 2,269,382 | Schmidt | Jan. 6, 1942 |
| 2,594,856 | Bluhm | Apr. 29, 1952 |
| 2,770,984 | Loecy | Nov. 20, 1956 |

FOREIGN PATENTS

| | | |
|---|---|---|
| 425,325 | Great Britain | Mar. 12, 1935 |
| 838,647 | Great Britain | June 22, 1960 |
| 1,198,151 | France | June 8, 1959 |